United States Patent
Cohen et al.

(10) Patent No.: US 8,121,888 B1
(45) Date of Patent: Feb. 21, 2012

(54) FACILITATING IMPROVEMENT OF RESULTS OF HUMAN PERFORMANCE OF TASKS

(75) Inventors: Peter D. Cohen, Seattle, WA (US); Isaac E. Nichols, Seattle, WA (US); Brian L. Cameros, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1102 days.

(21) Appl. No.: 11/957,060

(22) Filed: Dec. 14, 2007

(51) Int. Cl.
*G06Q 10/00* (2006.01)

(52) U.S. Cl. ............... 705/7.38; 705/7.41; 705/7.42

(58) Field of Classification Search ........... 705/7.38, 705/7.41, 7.42
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |
| 6,223,165 B1 | 4/2001 | Lauffer | 705/8 |
| 6,393,497 B1 | 5/2002 | Arnold et al. | 709/330 |
| 6,539,377 B1 | 3/2003 | Culliss | 707/5 |
| 6,546,087 B2 | 4/2003 | Shaffer et al. | 379/90.01 |
| 6,584,192 B1 | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |
| 6,636,590 B1 | 10/2003 | Jacob et al. | 379/114.05 |
| 6,704,403 B2 | 3/2004 | Lurie et al. | 379/114.1 |

(Continued)

OTHER PUBLICATIONS

"Askville FAQ," retrieved Nov. 16, 2007, from http://askville.amazon.com/faq.html, 11 pages.

(Continued)

*Primary Examiner* — Romain Jeanty
*Assistant Examiner* — Mark Fleischer
(74) *Attorney, Agent, or Firm* — Seed IP Law Group PLLC

(57) ABSTRACT

Techniques are described for facilitating interactions between task requesters who have tasks available to be performed and task performer users who are available to perform tasks, such as interactions that enable improvement of unsatisfactory task performance results from human task performer users. In some situations, after a task performer user has generated initial results from performance of a task supplied by a task requester, the task requester indicates that the initial results are only partially satisfactory (e.g., only partially satisfy one or more criteria for the task performance results), and may result in only a partial payment rather than a full payment amount associated with fully satisfactory performance of the task. The task requester may also supply information to provide one or more opportunities to the task performer user to supply additional improved supplemental results (e.g., so as to receive the full payment amount).

18 Claims, 6 Drawing Sheets

U.S. PATENT DOCUMENTS

| | | | |
|---|---|---|---|
| 6,707,904 B1 | 3/2004 | Judkins et al. | 379/265.06 |
| 6,763,104 B1 | 7/2004 | Judkins et al. | 379/265 |
| 6,810,383 B1 * | 10/2004 | Loveland | 705/7.13 |
| 6,859,523 B1 | 2/2005 | Jilk et al. | 379/32.01 |
| 6,938,048 B1 | 8/2005 | Jilk et al. | 707/102 |
| 7,155,400 B1 | 12/2006 | Jilk et al. | 705/9 |
| 7,197,459 B1 | 3/2007 | Harinarayan et al. | 704/270.1 |
| 7,827,066 B1 * | 11/2010 | Guy et al. | 1/1 |
| 7,933,790 B2 * | 4/2011 | Trickel | 705/1.1 |
| 2002/0069079 A1 | 6/2002 | Vega | 705/1 |
| 2002/0083079 A1 | 6/2002 | Meier et al. | 707/104.1 |
| 2003/0078852 A1 | 4/2003 | Shoen et al. | 705/26 |
| 2003/0200156 A1 | 10/2003 | Roseman et al. | 705/27 |
| 2003/0204449 A1 | 10/2003 | Kotas et al. | 705/27 |
| 2005/0289051 A1 * | 12/2005 | Allin et al. | 705/40 |
| 2006/0106675 A1 | 5/2006 | Cohen et al. | 705/26 |
| 2006/0106774 A1 | 5/2006 | Cohen et al. | 707/3 |

OTHER PUBLICATIONS

"Google Answers: Frequently Asked Questions," retrieved Nov. 16, 2007, from http://answers.google.com/answers/faq.html, 3 pages.

"Google Answers," retrieved Nov. 16, 2007, from http://en.wikipedia.org/wiki/Google_Answers, 4 pages.

"NowNow.com FAQ," retrieved Nov. 16, 2007, from http://www.nownow.com/nownow/faq.jsp, 6 pages.

U.S. Appl. No. 10/990,771, filed Nov. 16, 2004, Mortensen et al.

U.S. Appl. No. 10/991,339, filed Nov. 16, 2004, Cohen et al.

U.S. Appl. No. 11/334,773, filed Jan. 17, 2006, Cohen et al.

U.S. Appl. No. 11/395,831, filed Mar. 31, 2006, Cohen.

U.S. Appl. No. 11/535,388, filed Sep. 26, 2006, Cohen et al.

"About Spending," retrieved Nov. 23, 2004, from http://www.mypoints.com/mp/dstatial.show?isref=nmhp.popup.aboutspending.default, 1 page.

"Earning Points with MyPoints," retrieved Nov. 23, 2004, from http://www.mypoints.com/mp/dstatial.show?isref=nmhp.popup.aboutearning.default, 1 page.

"FAQs," retrieved Nov. 23, 2004, from http://www.mypoints.com/mp/dstatial.show?isref=nmhp.popup.faq.default, 1 page.

"Frequently Asked Questions about the Open Mind Initiative," retrieved Nov. 16, 2004, from http://www.openmind.org/FAQs.html, pp. 1-3.

"Frequently Asked Questions," TrueDater FAQ's, retrieved Apr. 4, 2005, from http://www.truedater.com/index.php?action=faqs, pp. 1-2.

"Grid—The Competitive Advantage," Aug. 2004, retrieved Jun. 9, 2005, from http://www.sun.com/solutions/documents/articles/grid_adv_aa.xml?null, pp. 1-2.

"Join MyPoints Now," retrieved Nov. 23, 2004, from http://www.mypoints.com/?MCK=ccb67d8c41a3819b, pp. 1-4.

"Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcf110252bb3f7/ff1c8, pp. 1-3.

"The ESP Game," retrieved Jun. 8, 2005, from http://www.espgame.org, 1 page.

"What is BonusMail®?," retrieved Nov. 23, 2004, from http://www.mypoints.com/mp/dstatial.show?isref=nmhp.popup.bonusmail.default, 1 page.

"What is Keen," retrieved Jun. 8, 2005, from http://www.keen.com/documents/homepage/wik_pop.asp?TID=gbFQnFLPstnUuFonMtBmHw, 1 page.

"What is MyPoints," retrieved Nov. 23, 2004, from http://www.mypoints.com/mp/dstatial.show?isref=nmhp.popup.whatis.default, 1 page.

About, Inc., "Intelligent Agents," retrieved Jun. 9, 2005, from http://psychology.about.com/od/intelligentagents/, pp. 1-5.

About, Inc., "Our Story," retrieved Jun. 9, 2005, from http://ourstory.about.com/, pp. 1-2.

About, Inc., Welcome to About.com, retrieved Jun. 9, 2005, from http://www.about.com, pp. 1-2.

Applied Skills & Knowledge, LLC, "Make Skills-Based Routing Happen," Jun. 3, 2003, retrieved from http://www.appliedskills.com/whitepapers/files/Skills-basedRouting.pdf, 3 pages.

Barlas, D., "Hipbone Connects to Kana," Jan. 5, 2004, retrieved Jun. 8, 2005, from http://www.line56.com/print/default.asp?ArticleID=5255, 1 page.

Calishain, T., "Yahoo! Service Offers More Advice than Expertise," May 6, 2002, retrieved Jul. 16, 2004, from http://www.infotoday.com/newsbreaks/nb020506-1.htm, pp. 1-2.

distributed.net, "distributed.net History & Timeline," retrieved Jun. 8, 2005, from http://www.distributed.net/history.php, pp. 1-7.

distributed.net, "The Organization," retrieved Jun. 8, 2005, from http://www.distributed.net/, pp. 1-2.

Doan, A., "MongoMusic Fans Include Microsoft," Sep. 9, 2000, retrieved Jun. 9, 2005, from http://www.forbes.com/2000/09/09/feat2.html, pp. 1-3.

Dubaud, S., "Advice Site Resort to Legal Counsel," Jan. 4, 2002, retrieved Apr. 29, 2004, from http://news.com.com/2011-1088-801359.html, pp. 1-3.

Elance Inc., Elance Online™—Everyday Outsourcing™, retrieved Jun. 9, 2005, from http://www.elance.com/c/static/main/displayhtml.pl?file=eol.html&module=home, pp. 1-2.

Elance, Inc., "Elance History," retrieved Jun. 8, 2005, from http://www.elance.com/c/static/main/displayhtml.pl?file=heritage.html, pp. 1-3.

eLancer homepage, retrieved Jun. 8, 2005, from http://www.elancer.us/, pp. 1-2.

Epinions, Inc., Epinions.com homepage, retrieved Jun. 9, 2005, from http://www.epinions.com, pp. 1-2.

Fox, S., "Can New Technology Revolutionize the Net?," Jun. 1, 2000, retrieved Jun. 8, 2005, from http://web.archive.org/web/20001018221958/www.cnet.com/insider/0-121949-7-1995365.html, pp. 1-3.

Get a Freelancer.com homepage, Innovate it, retrieved Jun. 9, 2005, from http://www.getafreelancer.com, pp. 1-3.

gonesilent.com homepage, Aug. 22, 2000, retrieved Jun. 8, 2005, from http://web.archive.org/web/20000822122731/www.gonesilent.com/about.html, pp. 1-2.

Google, "Ask a question, Set your Price. Get your Answer.," retrieved Jun. 9, 2005, from http://answers.google.com/answers/, 1 page.

Google, "Your Computer's Idle Time is too Precious to Waste," retrieved Jun. 9, 2005, from http://toolbar.google.com/dc/offerdc.html, 1 page.

Gunn, S., "Hey, buddy, can you spare some cycles?," Sep. 24, 1997, retrieved Jun. 8, 2005, from http://www.cnn.com/TECH/9709/24/netly.news/, pp. 1-4.

Hagel, J. et al., "Go Slowly with Web Services," Feb. 15, 2002, retrieved from http://www.cio.com/archive/021502/keynote.html, 4 pages.

Hagel, J., et al., "Your Next IT Strategy," *Harvard Business Review RO109G*:105-113, Oct. 2001.

Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.

Ingenio, Inc., Ingenio™ homepage, retrieved Jun. 8, 2005, from http://www.ingenio.com/default.asp?TF=1, pp. 1-2.

Ingenio, Inc., Introducing Ingenio™ Pay Per Call™, retrieved Jun. 8, 2005, from http://www.ingenio.com/documents/corp/home.asp, pp. 1-2.

Ingenio, Inc., Keen—Your Personal Advisor, retrieved Jun. 8, 2005, from http://www.keen.com, pp. 1-2.

Ingenio, Inc., Keen—Your Personal Advisor/Get Advice, retrieved Jun. 8, 2005, from http://www.keen.com/categories/get_answers.asp?SRCHT=0&search=&gid=0, 1 page.

Jupitermedia Corporation, "About jGuru.com: Overview," retrieved Jun. 9, 2005, from http://www.jguru.com/misc/about-overviewjsp, pp. 1-2.

Jupitermedia Corportion, jGuru homepage, retrieved Jun. 9, 2005, from http://www.jguru.com, pp. 1-5.

Kana Inc., "Corporate Overview," retrieved Jun. 8, 2005, from http://www.kana.com/about/about.aspx, pp. 1-2.

Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.

Kenexa, "Call Centers," retrieved Jun. 8, 2005, from http://www.kenexa.com/ind_callcent.html, pp. 1-3.

Lynn, R., "Keeping Online Daters Honest," Apr. 1, 2005, retrieved on Apr. 4, 2005, from http://www.wired.com/news/print/0,1294,67083,00.html, pp. 1-3.

Massive Multiplayer Online Role-Playing Game—homepage, retrieved Jun. 8, 2005, from http://www.mpog.com, pp. 1-2.

Microsoft Corporation, "Microsoft Acquires MongoMusic," Sep. 13, 2000, retrieved Jun. 9, 2005, from http://www.microsoft.com/presspass/press/2000/sept00/mongopr.mspx, pp. 1-2.

Mori, G., et al., "Breaking a Visual CAPTCHA," retrieved Jun. 8, 2005, from http://www.cs.berkeley.edu/~mori/gimpy/gimpy.html, pp. 1-4.

Mossberg, W., "GuruNet as a Reference Tool Goes Beyond Search Engines," Mar. 6, 2003, retrieved Jul. 20, 2004, from http://www.ptech.wsj.com/archive/ptech-20030306.html, pp. 1-3.

Multiplayer Online Games Directory—homepage, retrieved Jun. 8, 2005, from http://www.mpogd.com, 1 page.

Nortel Networks, "Beyond ACD—The advantages of Skill-based Routing in Today's Contact Centers," Mar. 7, 2003, retrieved from http://www.nortelnetworks.com/solutions/ccvp/collateral/nn103640-030703.pdf, 12 pages.

Online Multiplayer Games Network—homepage, retrieved Jun. 8, 2005, from http://www.omgn.com, pp. 1-2.

Project Gutenberg's Distributed Proofreaders—homepage, retrieved Jun. 9, 2005 from http://www.pgdp.net/c/default.php, pp. 1-4.

Rhodes, B., "The Wearable Remembrance Agent: A System for Augmented Memory," Appeared in *Personal Technologies Journal Special Issue on Wearable Computing* 1:218-224, 1997, retrieved Jun. 9, 2005, from http://www.bradleyrhodes.com/Papers/wear-ra-personaltech/, 10 pages.

Serena Software, Inc., "Serena™ Automating Change," retrieved Jun. 9, 2005, from http://www.serena.com, 1 page.

SETI Institute homepage, retrieved Jun. 9, 2005, from http://www.seti.org/site/pp.asp?c=ktJ2J9MMIsE&b=178025, pp. 1-3.

Siebel Systems, Inc., Siebel homepage, retrieved Jun. 8, 2005, from http://www.siebel.com/, pp. 1-3.

Singh, P., "Open Mind: common sense—Teaching computers the stuff we all know," retrieved Jun. 9, 2005, from http://commonsense.media.mit.edu/cgi-bin/search.cgi, pp. 1-2.

Singh, P., "The Open Mind Common Sense Project," Jan. 2, 2002, retrieved Jun. 9, 2005, from http://www.kurzweilai.net/articles/art0371.html, pp. 1-24.

Spice, B., "CMU Student Taps Brain's Game Skills," Oct. 5, 2003, retrieved Jun. 8, 2005, from http://www.post-gazette.com/pg/03278/228349.stm, pp. 1-5.

Spogg.com—homepage, retrieved Jun. 8, 2005, from http://www.spogg.com, pp. 1-2.

Sun Microsystems, Inc., "Products & Technologies—Java Technology," retrieved Jun. 9, 2005, from http://java.sun.com, pp. 1-2.

Sun Microsystems, Inc., "The Jini Technology Series: JavaSpaces Principles, Patterns, and Practice," retrieved Jun. 9, 2005, from http://java.sun.com/docs/books/jini/javaspaces/, pp. 1-2.

TopCoder, Inc., TopCoder homepage, retrieved Jun. 8, 2005, from http://www.topcoder.com/, pp. 1-2.

University of California, "What is SETI@home?," retrieved Jun. 9, 2005, from http://setiathome.ssl.berkeley.edu./, 1 page.

Wilson, B. "Anti-Social Software," Apr. 30, 2004, retrieved Aug. 26, 2005, from http://www.brendonwilson.com/profile/000156.shtml, 5 pages.

Wolverton, T., et al., "Yahoo Launches Advice Site," Apr. 29, 2002, retrieved Apr. 29, 2004, from http://news.com.com/2102-1017_3-894968.html?tag+st.util.print, pp. 1-2.

* cited by examiner

FACILITATING IMPROVEMENT OF RESULTS OF HUMAN PERFORMANCE OF TASKS

TECHNICAL FIELD

The following disclosure relates generally to facilitating the improvement of performance of tasks by human task performers, such as by enabling iterative improvement of generated results from performed tasks.

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user may visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

In addition to such Web-based interactions between computers (e.g., interactions initiated by users using Web browser applications to interactively request Web pages from Web servers), various distributed computing systems are known in which multiple computer systems interact in other manners in order to achieve a goal. For example it is often desirable for an application program on a computer system to interact with remote systems and applications in order to obtain various types of information and functionality that are not part of the application program. By performing such interactions, an application program may be able to leverage information and functionality from vast numbers of other computer systems over the Internet or other networks. In order to enable such interactions between remote computer systems and application programs, various programmatic interaction mechanisms have been developed. For example, remote procedure call ("RPC") protocols have long existed that allow a program on one computer to cause a program on another computer to be executed, and various object-oriented and other architectures such as CORBA ("Common Object Request Broker Architecture"), Java RMI ("Remote Method Invocation"), JavaSpaces, Jini, JXTA, UPnP ("Universal Plug and Play") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the Web has also provided additional opportunities for computers to inter-communicate in various programmatic manners. For example, there is growing use of the Web to provide so-called "Web services," which typically involve the programmatic interaction of remote applications to exchange information via defined APIs ("application program interfaces"), or the like. Web services may allow heterogeneous applications and computers to interact, and may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Unfortunately, while Web services and other programmatic interaction mechanisms allow various application programs and computers to interact, such interactions are typically limited in various ways. For example, the types of information and functionality that are available to be requested using such programmatic interactions are typically restricted to very limited types of requests that the remote computer systems and applications may automatically fulfill (e.g., to provide a specified predefined group of information, such as a Web page or file, or to perform a specified database query on a specified database). Moreover, there is a very large class of tasks which computers and application programs cannot easily automatically perform, but which humans can typically easily perform, referred to herein as "human performance tasks." This is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

However, existing settings that allow parties to make tasks available for performance by human users also have various problems. One example of a problem that arises in the context of human performance of tasks is that of receiving task results that are not satisfactory, such as due to users who attempt to perform tasks but do not read, understand, or otherwise follow instructions.

DETAILED DESCRIPTION

Figure 1:
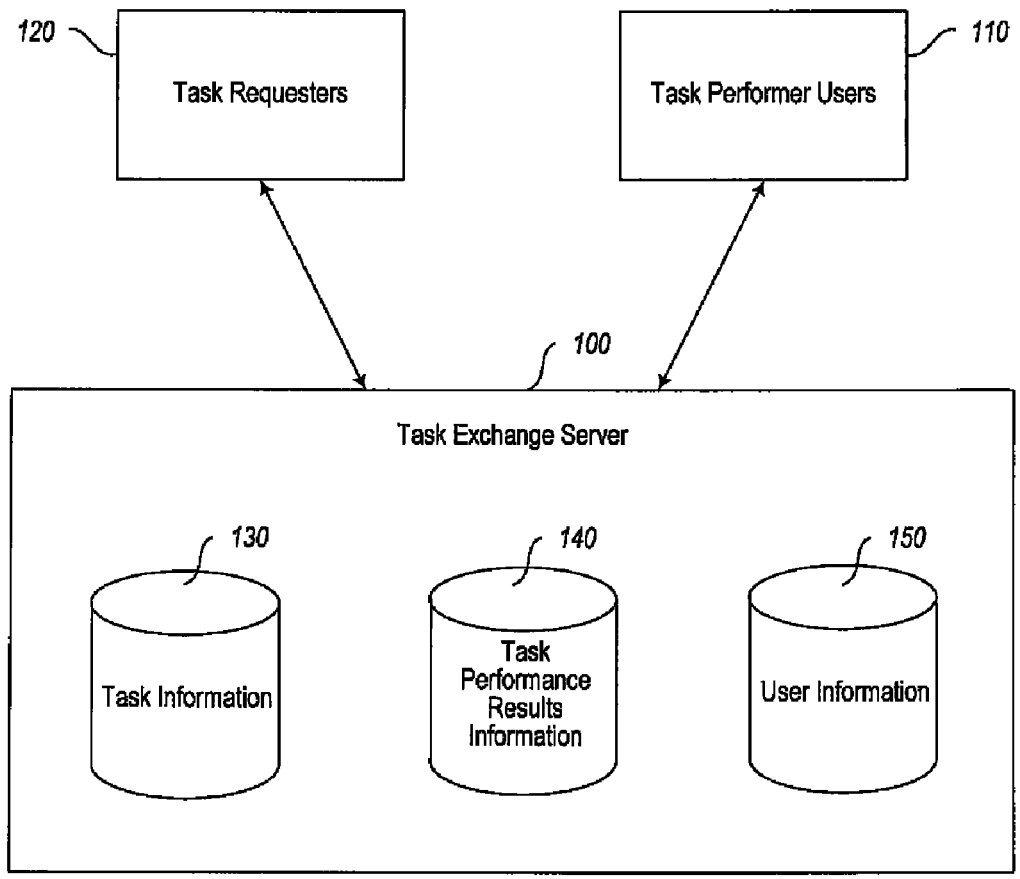
FIG. 1 is a block diagram illustrating an example embodiment of a system that facilitates improvement of results from performance of tasks.

Techniques are described for facilitating interactions between task requesters who have tasks available to be performed and task performer users who are available to perform tasks, such as interactions that involve human task performer users performing tasks supplied by task requesters. In at least some embodiments, after one or more task performer users have generated initial results from performance of a task, but the initial results are not fully satisfactory, at least one of the task performer users may be provided with one or more opportunities to correct or otherwise improve the initial generated task performance results. The identification that the initial results are not fully satisfactory and the one or more improvement opportunities for the results may be determined in various ways in various embodiments, including based on feedback from a task requester after reviewing the initial results, as discussed in greater detail below. In addition, in at least some embodiments, at least some of the tasks to be performed are human performance tasks that use cognitive and other mental skills of human task performer users, such as to employ judgment, perception and/or reasoning skills of the human task performer users. Furthermore, in at least some embodiments, an electronic task exchange server system acts as an intermediary to allow task requesters and task performer users to interact, and automatically performs some or all of the described techniques.

As previously noted, a determination that initial results from performance of a task are not fully satisfactory may be made in various ways in various embodiments. For example, in at least some embodiments, the initial results of performance of a task are provided to a task requester that supplied that task, and the task requester is provided with a mechanism to indicate whether or not the initial results are satisfactory (e.g., via an API that enables the task requester to programmatically provide a satisfactoriness indication for the results, such as to indicate that the results are fully satisfactory, are not satisfactory, and/or have one or more degrees or levels of partial satisfaction). In addition, in some embodiments, at least some tasks may each have one or more associated criteria for the results of performance of the task, and if so the determination of whether the results for a task are satisfactory may be made based at least in part on whether those results satisfy the associated criteria for the task, whether automatically by the task exchange server and/or by the task requester that supplied the task. For example, if multiple criteria are associated with a task and the initial performance results for the task satisfy only a subset of the multiple criteria, the initial results may be found to be only partially satisfactory (e.g., with a degree or level of partial satisfactoriness that varies based on a number of the multiple criteria that are satisfied and/or based on particular criteria that are satisfied). Furthermore, in at least some situations, a single criterion may be fully or partially satisfied, such as if it indicates a fully satisfactory level or degree and one or more levels or degrees of partial satisfaction (e.g., a criteria related to a quantity of individual items in generated results may specify that 5 or more items are fully satisfactory, and that each quantity less than 5 is a separate descending level of partial satisfaction).

Such task criteria may have various forms and may relate to various aspects of the desired results for performance of a task, such as, for example, criteria related to the form of the results, such as a format and/or type of data in the generated results (e.g., whether the results are in the form of a string or an integer, whether the results include a specified number of digits or other characters, whether the results match a predefined pattern, such as a phone number, credit card number, IP address, zip code, social security number, etc.), a check of particular values in the results (e.g., based on whether results are within a range or other enumerated group of allowable values), whether the results are part of an indicated category, etc.). Task criteria may further include, for example, criteria related to how the results are generated (e.g., via one of multiple techniques for generating the results, via one of multiple types of computing devices or other devices used to generate the results, etc.), criteria related to when the results are generated (e.g., before an indicated deadline, within an indicated range of time, etc.), criteria related to the task performer users who generate the results (e.g., whether the task performer users satisfy any preferred or required qualifications), criteria related to how the results are provided, criteria related to quality of the results, etc. As one specific example, in some embodiments, criteria may include various types of validation tests or other types of validation actions to be performed as part of evaluating task performance results in order to generate a determination of whether the results are valid (e.g., by passing the tests or otherwise having the validation actions succeed). In addition, in some embodiments, task requesters may further be able to supply executable code (e.g., a script, program, applet, etc.) to be used as a validation criterion by executing the code so as to evaluate the results, and/or may be able to specify executable logic or other relationships between other specified criteria. Furthermore, in some embodiments, criteria may be specified in manners other than by the task requesters who supply tasks, such as automatically by the task exchange server and/or based on instructions or feedback provided by the task performer users. In addition, in at least some embodiments criteria may have associated conditions under which the criteria are to be applied, such as if the criteria are only used to evaluate a subset of task performance results for a type of task or other group of tasks (e.g., for the purposes of sampling results). Additional details regarding such criteria are discussed in greater detail below.

When initial results from performance of a task are determined to not be fully satisfactory, various actions may be taken in various embodiments. For example, in at least some embodiments, a task requester may offer a range of rewards (e.g., various payment levels) to a task performer user depending upon whether the task performer user's results for performance of a particular task are fully satisfactory, partially satisfactory (e.g., with one or more possible levels of partial satisfaction), or not satisfactory. For example, full payment may be given for results that fully satisfy task criteria or that are otherwise determined to be full satisfactory, a first partial payment may be given for results that are determined to demonstrate a first level of partial satisfaction (e.g., based on a partial satisfaction of task criteria or as otherwise determined), a second partial payment may be given for results that are determined to demonstrate a second level of partial satisfaction (e.g., based on a partial satisfaction of task criteria or as otherwise determined), etc. In addition, no payment may be given for results that fail, or in some cases only partially satisfy, task criteria. Such full and/or partial payment amounts may be specified in various ways, such as for a task requester to specify a full payment amount when supplying a task to be performed, and to specify a partial payment amount for particular results after those results are received and reviewed by the task requester (e.g., based on feedback or other information supplied by the task requester via an API or other mechanism provided to allow the task requester to indicate such payment amounts). In other embodiments, full and/ or partial payment amounts may be specified in other manners, such as if the task requester initially specifies one or more levels of partial payment before results of task performance are received, if the task request specifies a full payment level only after task performance results are received, if the task exchange server automatically determines one or more of the full and partial payment amounts, etc.

In addition, when initial results from performance of a task are determined to not be fully satisfactory, another type of action that may be taken in at least some embodiments includes providing an opportunity to a task performer user to improve the initial performance results, such as by providing additional supplemental results that are intended to be more fully satisfactory (e.g., to fully satisfy task criteria). In some such embodiments, such an opportunity to a task performer user is provided to allow the task performer user to receive a full payment amount or other reward commensurate with fully satisfactory results if the supplemental results are fully satisfactory. Such an opportunity may, for example, occur after initial results from a task performer user for a task supplied by a task requester are determined to not be fully satisfactory (whether by the task requester or automatically by the task exchange server), such as to allow the task performer user to either accept partial payment for the initial results that correspond to those initial results being only partially satisfactory, or to provide additional supplemental results in an attempt to fully satisfy task criteria in order to receive a reward commensurate with fully satisfactory results. As with indications of satisfactoriness and indications of partial payment amounts, the availability of such an opportunity to improve initial task performance results may be specified in various ways, such as by a task requester after those initial results are received and reviewed by the task requester (e.g., based on feedback or other information supplied by the task requester via an API or other mechanism provided to allow the task requester to indicate such an opportunity). For example, the task requester may provide feedback to the task performer user regarding one or more manners in which to improve initial task results (e.g., so at to include comments regarding how to improve the initial task results, such as based on one or more criteria that are not satisfied), optionally with an associated supplemental payment amount for each such results improvement (e.g., a supplemental payment amount in addition to the partial payment amount, such as some or all of the difference between the partial payment amount and the full payment amount; a supplemental payment amount to replace the partial payment amount, such as some or all of the full payment amount; etc.), such that the task performer user is provided with one or more results improvement options. In other embodiments, results improvement options and/or supplemental payment amounts may be specified in other manners, such as if the task requester initially specifies one or more such results improvement options and/or associated supplemental payment amounts before results of task performance are received, if the task exchange server automatically determines one or more results improvement options and/or associated supplemental payment amounts, etc.

When a task requester designates an opportunity to improve results from prior performance of a task, the opportunity may in some embodiments be provided to the task performer user that initially performed the task and generated those performance results, while in other embodiments and situations, such an opportunity may be provided to other task performer users (e.g., those with higher or more relevant qualifications, any task performer user qualified to initially perform the task, etc.). A task performer user who accepts an opportunity to improve results by submitting one or more additional supplemental results may potentially receive up to the full payment amount or other full reward for the task. The additional supplemental results may include, for example, corrections or other modifications to the initial results, enhancements to the initial results, substitute results (e.g., new results that are generated independently of the initial results), etc. Furthermore, the process of one or more task performer users providing additional supplemental results for a task may be repeated multiple times in at least some embodiments and situations (e.g., with each supplemental results being provided to the task requester so that the task requester may evaluate and provide feedback on the supplemental results, such as to indicate one or more areas for improvement), such as to allow iterative improvements to task performance results until they are sufficiently satisfactory. Alternatively, in some situations, a task requester may choose not to offer opportunities to improve initial or supplemental results even if they are not fully satisfactory, such as after receiving and reviewing those results (e.g., so as to provide partial payment for those results without opportunity for results improvement).

As noted above, in at least some embodiments, the task exchange server may automatically perform at least some of the techniques for facilitating improvement of task performance results, with or without the assistance of the task requester reviewing the results. For example, the task exchange server may automatically validate at least some task performance results, such as to determine whether to provide full payment for fully satisfactory results, and/or to identify and/or handle results that are not fully satisfactory. Additional details related to validation of task performance results are included in pending commonly-owned U.S. patent application Ser. No. 11/535,388, filed Sep. 26, 2006 and entitled "Automated Validation Of Results Of Human Performance Of Tasks," which is herein incorporated by reference in its entirety.

As previously noted, in at least some embodiments, the described techniques may be performed by an electronic task exchange server that acts as an intermediary to allow task requesters and task performer users to interact. In particular, in some embodiments, one or more computing systems providing the task exchange server act as an intermediary to allow task requesters to programmatically request (e.g., via programmatic invocations of one or more APIs of the task exchange server by application programs of the task requesters) that tasks be performed by human task performer users and to receive corresponding results after the tasks are performed (e.g., as responses to the programmatic invocations), thus providing a form of artificial intelligence to task requesters' application programs. Similarly, human task performer users may access the task exchange server (e.g., in a programmatic or interactive manner) to obtain information about available tasks that they may perform and to provide the results of task performance after the completion of tasks that they are assigned. Such interactions with the task exchange server by task requesters and task performer users may similarly enable the improvement of task performance results in the manners described herein. By enabling large numbers of unaffiliated or otherwise unrelated task requesters and task performer users to interact via the intermediary task exchange server in this manner, free-market mechanisms mediated by the Internet or other public computer networks may be used to programmatically harness the collective intelligence of an ensemble of unrelated human task performer users. Additional details related to the function and operation of various embodiments of task exchange server systems, such as a task fulfillment facilitator system embodiment, are included in pending commonly-owned U.S. patent application Ser. No. 10/990,949, filed Nov. 16, 2004 and entitled "Providing an Electronic Marketplace to Facilitate Human Performance of Programmatically Submitted Tasks;" in U.S. patent application Ser. No. 11/334,773, filed Jan. 17, 2006 and entitled "Performing Automated Price Determination For Tasks To Be Performed;" and in U.S. patent application Ser. No. 11/842,730, filed Aug. 21, 2007 and entitled "Transferring Entity-Related Data Between Storage Partitions;" each of which is hereby incorporated by reference in its entirety.

FIG. 1 is a block diagram illustrating an example of users interacting with a remote system that stores various data and provides various types of functionality, with embodiments of such a system able to use various of the described techniques for facilitating the improvement of results of human performance of tasks. In particular, in this example, the system storing the data is a task exchange server system 100 that provides functionality related to human performance of tasks, such as by managing data related to tasks and to users who supply and/or perform the tasks. For illustrative purposes, some embodiments are described herein in which specific types of users interact with specific types of systems in specific ways, and in which the systems store specific types of data and provide specific types of related functionality, including specific types of techniques for facilitating the improvement of results from tasks performed by task performer users. For example, in some embodiments, specific types of criteria related to the performance of one or more tasks may be stored and used to assess results from human performance of such tasks. In addition, different types and levels of rewards may be associated with different types of tasks and different levels or degrees of satisfactoriness of task performance results. These examples are provided for illustrative purposes and are simplified for the sake of brevity, and the techniques disclosed herein may be used in a wide variety of other situations, some of which are described herein.

The task exchange server 100 may be implemented in various ways in various embodiments, such as in the form of a software system executing on one or more computing systems or devices (e.g., in a distributed manner, such as on a peer-to-peer or grid network). Furthermore, while not illustrated in this example embodiment, in some embodiments data may be stored across multiple alternative storage partitions on multiple alternative computing nodes, such that at least some types of data are stored only on a single partition. For example, data within the system 100 may be organized based on users with which the data is currently associated, so as to store a group of data related to a particular user together on a particular storage partition, and with each user being associated with one of the alternative computing nodes whose storage partition stores data for the user. The associated alternative computing node for a user may further provide at least some of the functionality of the system 100 to the user, such as to process and respond to various types of requests received from the user. In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the task exchange server 100 may facilitate the submission and performance of such human performance tasks. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

In the example of FIG. 1, the task exchange server 100 includes a task information data repository 130, task performance results information data repository 140, and a user information data repository 150. Various task requesters 120 may interact with the task exchange server 100 in order to supply tasks that are available to be performed by task performer users 110, potentially along with criteria for task performance results of such tasks, as well as to perform other related activities. For example, in addition to supplying tasks, a task requester 120 may interact with the task exchange server 100 to obtain results from the performance by one or more task performer users 110 of previously supplied tasks, to provide feedback regarding obtained task performance results (e.g., to indicate partial payments for the partially satisfactory task performance results; to indicate opportunities to improve obtained task performance results that are not fully satisfactory, such as with comments or other information regarding how to improve the results; etc.), to obtain information about an account of the task requester (e.g., information about financial payments made to other users for performing tasks supplied by the task requester, information about previously specified preferences, etc.), to search for information about tasks and/or about task performer users who are available to perform tasks, to specify types of qualifications that task performer users may need to perform supplied tasks, etc. The task requesters 120 may take various forms, such as a task requester user who interactively accesses the system 100 (e.g., via a GUI, or graphical user interface, displayed on a computing system of the task requester user, not shown, such as a GUI based on Web pages provided by the system 100 and/or based on execution of a client-side application on the computing system), or a software application that is programmatically interacting with the system 100 (e.g., via an API of the system 100, not shown) on behalf of a related task requester user.

When a task requester supplies information about one or more tasks, the task exchange server 100 stores the task-related data in the task information data repository 130, which may then be made available to task performer users 110 to perform the tasks in a manner specified by the task requester or otherwise determined by the task exchange server 100. The supplied information for a task may include a variety of types of information, including details related to the task (e.g., information to be analyzed, a question to be answered, etc.), one or more qualifications of any task performer user who performs the task, one or more geographical locations associated with the task, one or more capabilities and/or other current characteristics of one or more devices to be used as part of performing the task, one or more other criteria related to task performance (e.g., deadlines for completion, format of results from task performance, various validation criteria or other criteria associated with the quality of results or the values produced by results, etc.), one or more associated rewards (e.g., monetary payments) to be provided to one or more task performer users who successfully perform the task and/or who perform the task in a partially satisfactory manner, etc.

The task exchange server 100 also provides various functionality related to the performance of tasks by task performer users 110. For example, when a task performer user requests information about available tasks (e.g., as part of a search or browse request), the task exchange server 100 provides task-related data obtained from the task information data repository 130. In addition, when a task performer user requests to perform (or is assigned for performance) a particular task, the task exchange server 100 stores a temporary association between the task performer user and the task (e.g., in the task performance results information data repository 140). Then, when the task performer user has completed performance of the task, such as by providing task results for the performed task to the task exchange server 100, the task exchange server 100 stores the task results in the task performance results information data repository 140. The task exchange server 100 may also perform other related functions, such as notifying a task requester of the task results and/or completion of the performed task, facilitating a reward for performing the task (e.g., by crediting an account associated with the task performer, initiating a funds transfer, etc.), automatically validating task results, indicating results improvement options and/or a partial payment amount to a task performer user when task results from the task performer user are not fully satisfactory, etc.

The task exchange server 100 also provides various functionality related to the management of various users, such as task requester users and task performer users. For example, such users may register with the task exchange server 100 by providing identifying information (e.g., name, address, telephone number(s), email addresses, etc.), possibly accompanied by various user preference information and/or payment information that may be used to facilitate payments between task requesters and task performer users for the performance of tasks. Such user-related information may be stored by the task exchange server 100 in the user information data repository 150, and the task exchange server system 100 may further in some embodiments store various user-related information in the repository 150 (e.g., information about previously interactions between the system and the user, such as to reflect aggregate information about previous task performance for task performer users). In addition, task performer users may also in at least some embodiments obtain qualifications that may be utilized for purposes of matching task performer users with appropriate tasks, with such qualification information also being stored in the user information data repository 150.

Furthermore, the task exchange server 100 also in at least some embodiments provides functionality related to improving results obtained from previous task performance by task performer users. Improved results may be provided by, for example, supplemental results that correct, enhance and/or replace prior results. For example, the task exchange server 100, after receiving results of performance of a task by a task performer user, may make the results available to the task requester that supplied the task. The task requester may then obtain the results, for example, by requesting them from the task exchange server 100, or by the task exchange server 100 forwarding the results to the task requester. Further, the task requester may interact with the task exchange server to classify the results as fully satisfactory (e.g., based on satisfying one or more criteria associated with the task), unsatisfactory (e.g., based on failing to satisfy at least one or all of the criteria associated with the task), or partially satisfactory (e.g., with one or more levels or degrees of partial satisfactoriness, such as based on satisfying only some of the criteria associated with the task). In some situations, the task requester may determine that partial satisfaction of a particular task is not acceptable, and may classify such partially satisfactory results as unsatisfactory.

In some situations, as previously discussed, different payment amounts or other rewards may be associated with different results satisfactoriness classifications. For example, a task requester may designate when supplying a task to the task exchange server 100 (or at other times) an indicated full payment amount for results that are determined to be fully satisfactory, that no payment may be associated with results that are determined to be unsatisfactory, and one or more partial payment amounts for results that are determined to be partially satisfactory with one or more levels or degrees of partial satisfactoriness. In addition, the task requester may indicate to the task exchange server 100 that one or more opportunities for improving unsatisfactory and/or partially satisfactory results are to be provided to a task performer user who generated less than fully satisfactory results (or to other task performer users), such as after reviewing those results or instead when initially supplying the task to the task exchange server to be performed. The task requester may further indicate a supplemental payment amount to be associated with a particular option for improving the results (e.g., to improve results so that they satisfy one or more indicated criteria or otherwise are improved in one or more indicated manners), such as to be paid after receiving improved results in accordance with that results improvement option. The task exchange server 100 may then provide information about one or more results improvement options to the task performer user (or the other task performer users). In addition, the task exchange server 100 may facilitate a task performer user receiving a partial payment for partially satisfactory results, such as when the task performer user does not seek to improve initial results in accordance with one or more results improvement options, or when such results improvement options are not made available to the task performer user.

For example, in at least some embodiments, once a task requester has reviewed obtained results, the task exchange server 100 may receive an indication from the task requester that the results are only partially satisfactory and that the task requester desires to permit a task performer user to improve the results by providing additional supplemental results, such as in accordance with criteria associated with the task. In addition, the task requester may indicate a partial payment amount to be made available to the task performer user for the reviewed obtained results. The task requester may further indicate one or more payment amounts to be made available to the task performer user when additional supplemental results are provided that are fully satisfactory or that otherwise satisfy criteria for those supplemental results. The task exchange server 100 may then provide information to the task performer user about one or more results improvement options that reflect the partial payment amount, potentially additional criteria for achieving an improved result in accordance with each of one or more results improvement options, and any supplemental payment amount associated with a results improvement option for an improved result. After receiving any additional supplemental results from the task performer user in response to the results improvement options, the task exchange server 100 may then make available to the task requester those additional supplemental results and/or facilitate providing corresponding partial payment to the task performer user. The task requester may then evaluate the additional supplemental results in a similar manner to that described for evaluating the initial results, such as to classify them as satisfactory, unsatisfactory, or partially satisfactory, and to repeat the process for deciding whether to provide an additional opportunity to further improve the additional supplemental results. Accordingly, performance results for a task may be iteratively improved as designated by a particular task requester.

Furthermore, in at least some embodiments, a task requester may specify one or more criteria that enable the task exchange server 100 to automatically validate received performance results, such as to classify satisfactoriness of the results, provide results improvement options as previously designated by the task requester, and/or make partial payments to task performer users. In some cases, the task exchange server 100 may automatically validate initial results and/or additional supplemental results. Thus, the automatically validation of results may similarly be repeated to iteratively improve performance results for a task as designated by a particular task requester in at least some embodiments.

Figure 2:
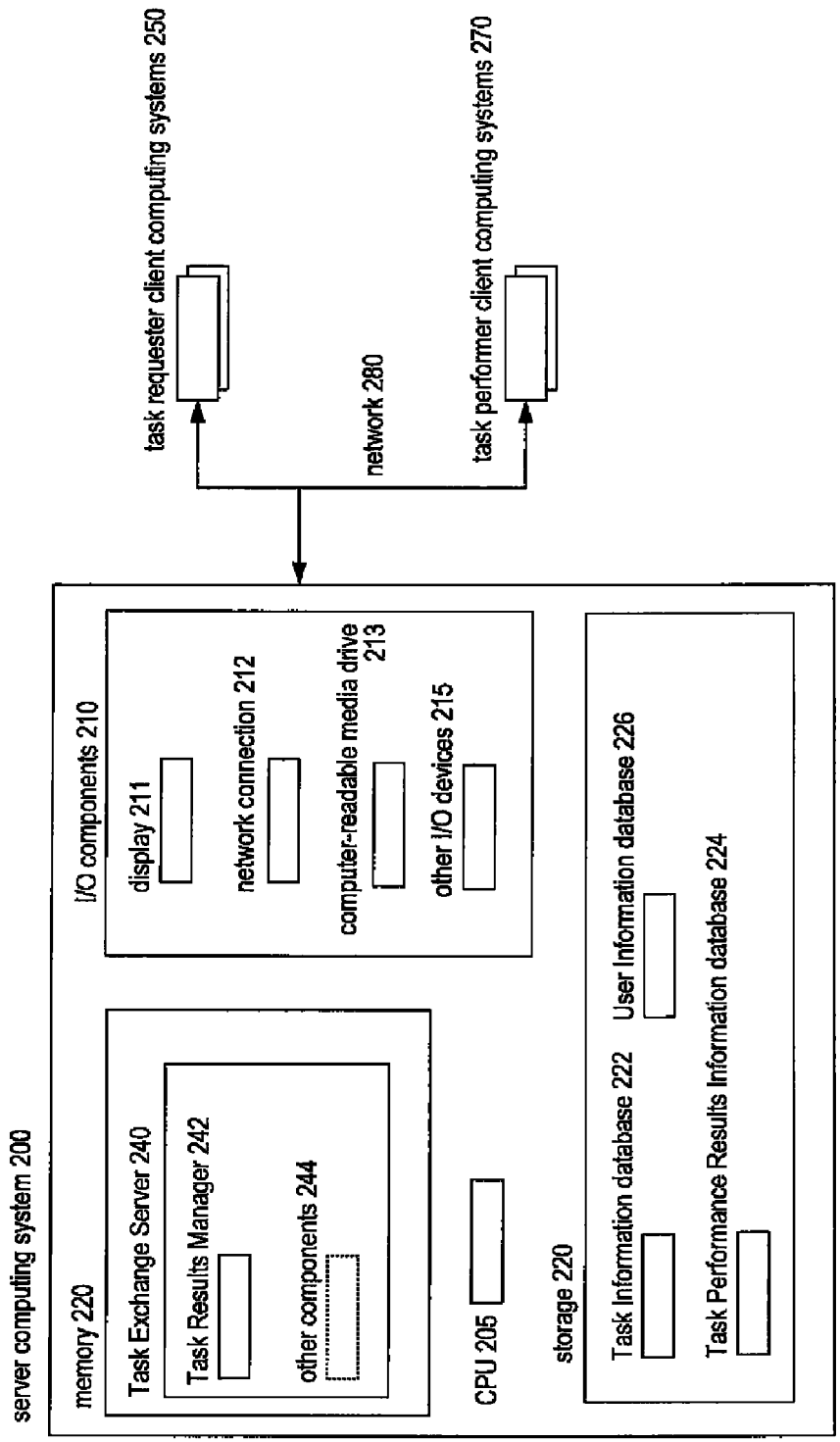
FIG. 2 is a block diagram illustrating a computing system suitable for executing an embodiment of a system that facilitates improvement of results from performance of tasks.

FIG. 2 is a block diagram illustrating a computing system suitable for executing an embodiment of a system that facilitates improvement of results for performance of tasks. In particular, FIG. 2 illustrates a server computing system 200 suitable for executing an embodiment of a task exchange server system 240, as well as various task requester client computing systems 250 and task performer client computing systems 270. In the illustrated embodiment, the server computing system 200 includes a CPU 205, various I/O components 210, storage 220, and memory 230. The I/O components include a display 211, a network connection 212, a computer-readable media drive 213, and other I/O devices 215 (e.g., a keyboard, mouse, speakers, etc.).

An embodiment of the task exchange server 240 is executing in the memory 230, and it interacts with the other computing systems 250 and 270 over a network 280 using the network connection 212 (e.g., via the Internet and/or the World Wide Web). In the illustrated example, the task exchange server 240 is a software implementation of the task exchange server 100 described with reference to FIG. 1. The illustrated embodiment of the task exchange server system 240 includes a Task Results Manager component 242, and optionally one or more other components 244 (e.g., an optional automated results validation component as described with respect to FIG. 5 and elsewhere). As described in greater detail elsewhere, the task exchange server 240 may provide various functionality to act as an intermediary to facilitate performance by task performer users of tasks supplied by task requesters, and the component 242 may provide various functionality related to improving task performance results by implementing at least some of the techniques described herein. The task exchange server 240 and its components may also access and use various task-related and user-related information on storage 220, such as in task information database 222, task performance results information database 224, and user information database 226. The task information database 222, task performance results information database 224, and user information database 226 are respective database systems that may, for example, be used to implement the task information data repository 130, task performance results information data repository 140, and user information data repository 150 described with reference to FIG. 1.

Human task requester users may use, for example, application programs (not shown) executing on the task requester client computing systems 250 to communicate via the network 280 with the task exchange server 240, such as to submit tasks to be performed (e.g., tasks with associated criteria), obtain results of performance of such task by task performer users, and evaluate and provide feedback regarding obtained task performance results. In addition, human task performer users may utilize Web browsers or other programs (not shown) executing on the task performer client computing systems 270 to communicate via the network 280 with the task exchange server 240, such as to perform tasks, provide task performance results, receive information about results improvement options for performance results of previously performed tasks, and provide additional supplemental results in accordance with one or more results improvement options. The programs used by the task requester users and/or task performer users may, for example, include custom client applications that communicate via standard and/or proprietary protocols with the task exchange server 240 and/or some intermediary application (e.g., a Web server). In some embodiments, the task exchange server 240 may further provide an API that provides programmatic access to at least some of the functionality provided by the task exchange server 240.

It will be appreciated that computing systems 200, 250, and 270 are merely illustrative and are not intended to limit the scope of embodiments of the present disclosure. The task exchange server 240 may instead be executed by multiple interacting computing systems or devices, and computing system 200 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware, firmware, or software that may interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task exchange server 240 may in some embodiments be provided via various components, and may be combined in fewer components or distributed in additional components than those described herein. Similarly, in some embodiments, at least some of the described functionality may not be provided as part of the task exchange server 240 and/or the Task Results Manager component 242, and/or other additional functionality may be available.

It will also be appreciated that, while various items are discussed or illustrated as being stored in memory or on storage while being used, these items or portions of them may be transferred between memory and other storage devices for purposes of memory management and data integrity. Alternatively, in other embodiments, some or all of the software components may execute in memory on another device and communicate with the illustrated computing system via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated stored data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 3A:
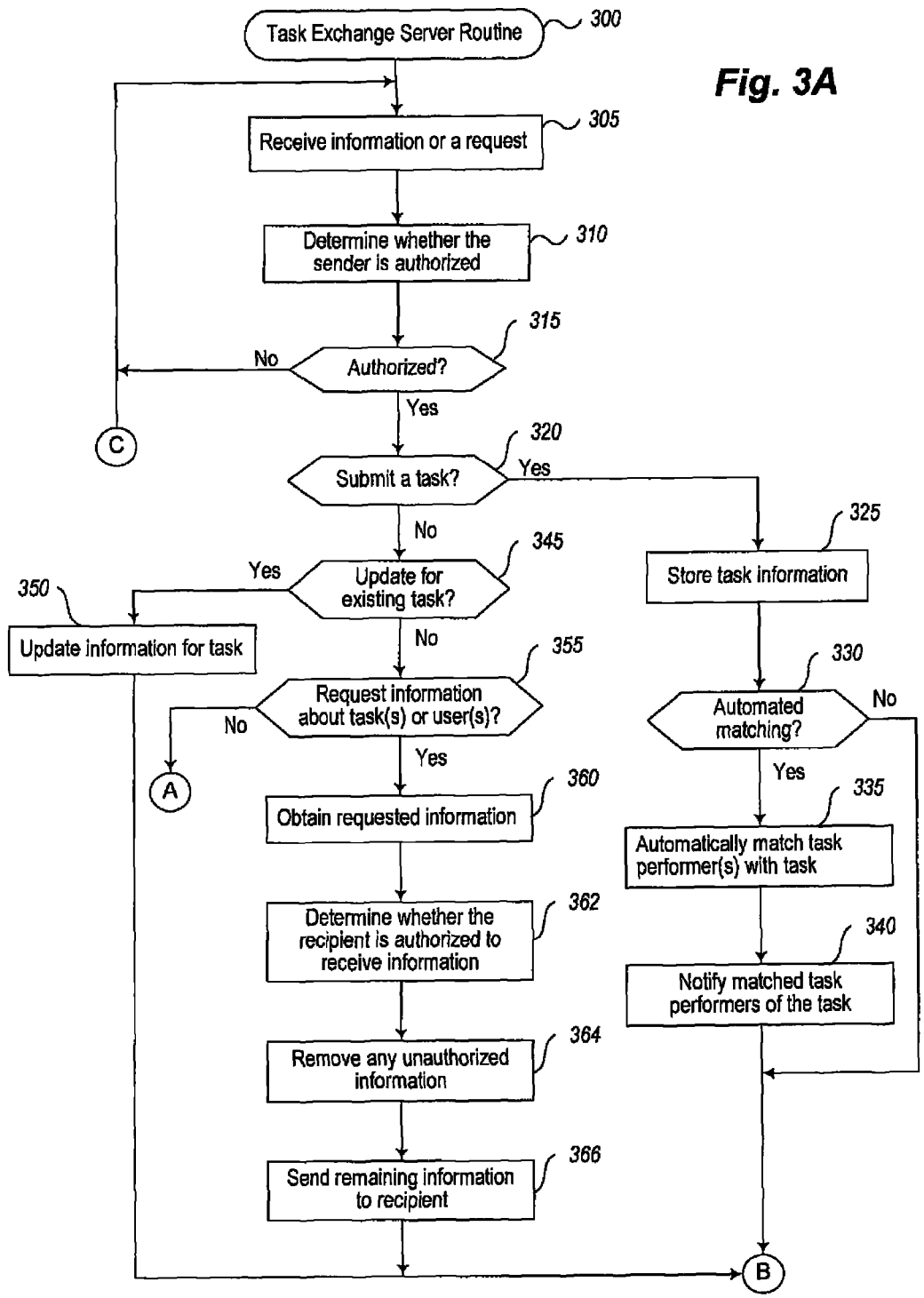
FIGS. 3A and 3B are a flow diagram of an example embodiment of a Task Exchange Server routine.
Figure 3B:
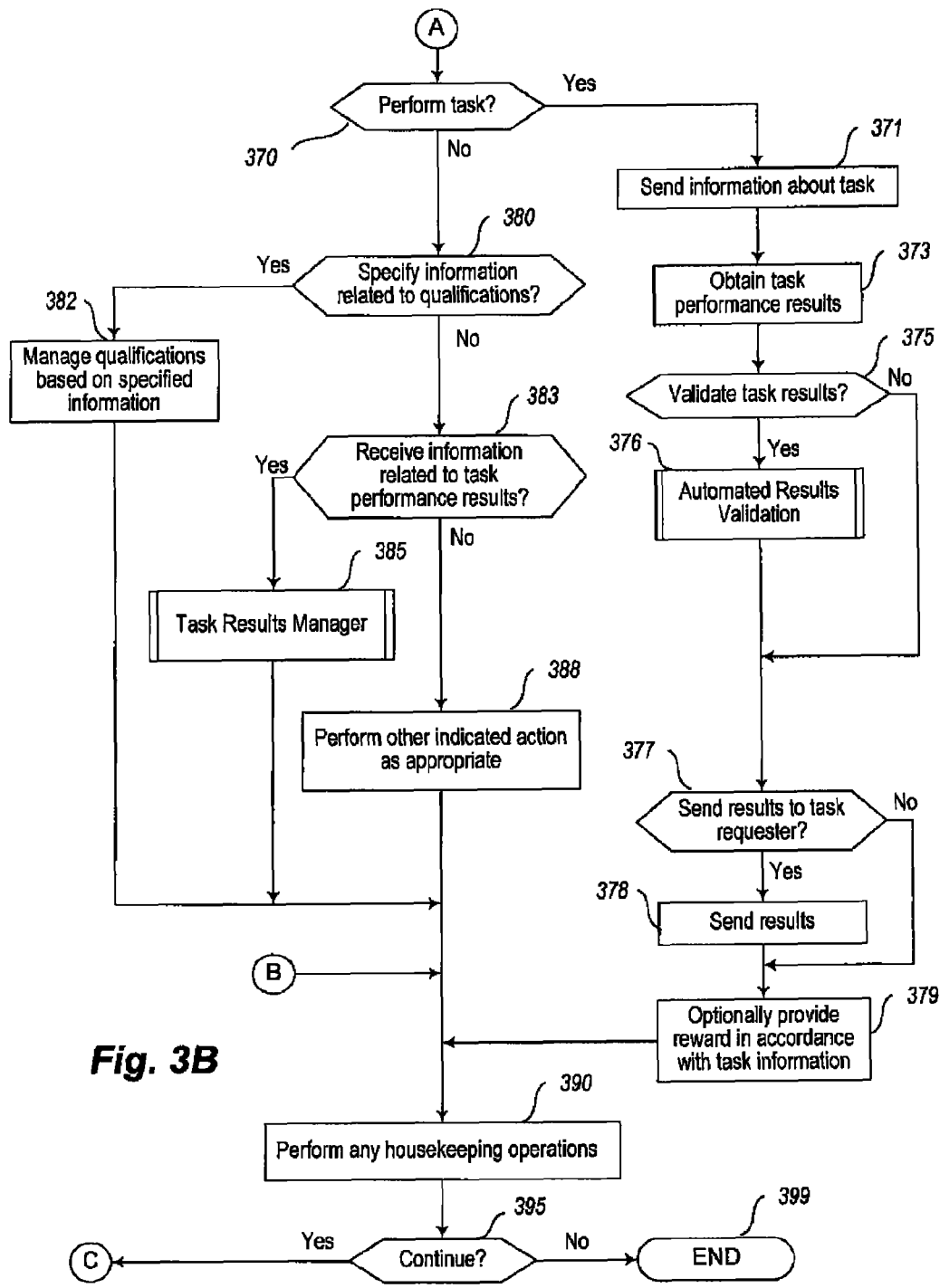

FIGS. 3A and 3B are a flow diagram of an example embodiment of a Task Exchange Server routine 300. The routine may be provided by, for example, execution of an embodiment of the task exchange server 100 of FIG. 1 and/or the task exchange server 240 of FIG. 2, such as to in this illustrated embodiment facilitate performance of tasks by interacting with task requesters and task performer users as appropriate, as well as to facilitate improvement of results from the performance of tasks by task performer users.

In overview, the routine interacts with task requesters and task performer users to perform multiple functions, including, for example, to handle requests to submit tasks, to update existing tasks, to perform tasks, to manage qualifications, etc. Once initial task performance results have been obtained, the routine may use information provided by the associated task requester to facilitate improving the results, such as by offering opportunities to task performer users to improve the initial results. The illustrated embodiment of the routine may determine whether obtained performance results satisfy criteria associated with a task in one of two ways, or in a combination of both. In a first manner, the routine may make the results available to the corresponding task requester and then respond to feedback from the task requester regarding whether those results are satisfactory and/or how to proceed. In a second manner, the routine may automatically validate at least the initially received results, and in some scenarios one or more additional supplemental results, to determine whether those results are satisfactory and/or how to proceed. To perform the automated validation, the routine may incorporate and apply one or more validation criteria (e.g., characteristics, business or programming logic, rules, etc.) provided by the task requester for the task. Other embodiments of the routine may operate in other manners, such as to not perform automated validation of results.

In this illustrated embodiment, the routine begins in block 305, where an indication is received of information or a request, and in block 310 determines whether the sender of the information or request is authorized to perform requests of that type or provide information of that type (e.g., based on prior registration of the users with the task exchange server, and/or on other previously defined access controls for specific users or types of users). If the routine identifies the sender as authorized in block 315, the routine continues to block 320 to determine whether the received indication was a request to submit a task. If so, the routine continues to block 325 to store task information received in block 305, including any specified criteria related to task performance (e.g., criteria for use in determining satisfactoriness of task performance results), information about any associated payments or other rewards for performance of the task (e.g., a full payment amount, one or more partial payment amounts, etc.), and any associated information to be analyzed or manipulated as part of the task. The routine then continues to block 330 to determine whether to perform automated matching to identify task performer users who are appropriate to perform the task, such as based on the type of task submitted and/or an explicit request by the submitter of the task, although in other embodiments such automated matching functionality may not be provided. In the illustrated embodiment, if automated matching is to be performed, the routine continues to block 335 to automatically match one or more task performer users with the task by, for example, identifying one or more task performer users whose qualifications satisfy any qualification criteria for the new task. The routine then notifies those identified task performer users of the task in an appropriate manner in block 340 (e.g., based on previously specified user preferences for those task performer users). After block 340, or if it was instead determined in block 330 that automated matching was not to be performed, the routine continues to block 390.

If it was instead determined in block 320 that the received indication was not to submit a task, the routine continues instead to block 345 to determine whether a request was received to perform an update for an existing task, and if so continues to block 350 to perform the update as appropriate. Such updates may take a variety of forms, such as to modify information about or delete a pending task that has not been performed; to perform an indicated activity related to a task (e.g., to cause a reward to be provided to a task performer user after the task requester has reviewed and accepted task performance results from that task performer user); to add, modify, or remove criteria associated with an existing task (including, for example, automated validation or other criteria used to assess satisfactoriness of results); etc. If it was instead determined in block 345 that the received indication was not to update an existing task, the routine continues to block 355 to determine whether the received indication was a request for information about one or more tasks and/or one or more users, such as for a search or browse request. If so, the routine continues to block 360 to identify and obtain the requested information, and then continues to block 362 to determine whether the indicated recipient of the information is authorized to receive all of the obtained information, such as based on access controls associated with any aspects or elements of the obtained information (although in other embodiments the access determination may be made before or as part of the obtaining of the information). In block 364, the routine then removes information for which the recipient is not authorized, if any, and in block 366 sends any remaining information to the recipient. In some embodiments, indications may be provided to the recipient of any removed information for which they were not authorized, while in other embodiments such indications may not be provided. After blocks 350 or 366, the routine continues to block 390.

If it was instead determined in block 355 that the received indication was not a request for information about tasks or users, the routine continues instead to block 370 to determine whether the received indication was a request from a task performer user to perform an indicated task. If so, the routine continues to block 371 to retrieve and provide information about the task to the task performer user in an appropriate manner (e.g., in a manner specified for the task), and in block 373 obtains results of performance of the task by the task performer user. In block 375, the routine then determines whether to validate the task results, such as based on whether a task requester has specified that the results for the task are to be automatically validated. If so, the routine continues to block 376 to execute a routine to automatically validate task results, for example as described with respect to FIG. 5. Validating task results may be performed in various ways. For example, task results may be analyzed according to validation criteria supplied by a task requester when submitting a task. The task validation criteria may include rules for determining whether results may be deemed to be fully satisfactory, not satisfactory, or partially satisfactory. In addition, indications of results improvement options and corresponding supplemental payment amounts may be specified along with the validation criteria. As noted, as part of executing the routine corresponding to block 376, one or more actions may be taken related to assessing results, including offering results improvement options to a task performer user to improve partially validating results and facilitating partial payment for partially satisfactory results, as discussed in greater detail elsewhere.

After block 376, or if it was instead determined in block 375 not to validate the task results, the routine continues to block 377. In block 377, the routine then determines whether to immediately send the task results to the task requester, such as based on information associated with the task, the outcome of the automated validation of block 376 (e.g., to not send the results if they are automatically determined to be unsatisfactory, or to not send the results if they are automatically determined to be partially satisfactory and the task requester has indicated that partially satisfactory results are not of interest), and/or based upon user preferences for the task requester. If so, the routine continues to block 378 to send the results. After block 378, or if it was instead determined in block 377 not to send the results to the task requester at this time, the routine continues to block 379 to optionally provide any reward associated with the task to the task performer user, such as in accordance with the task information and/or the outcome of the automated validation of block 376 (e.g., to provide full or partial payment or other rewards based on the automated validation). Such rewards may also be provided or facilitated to be provided at other times, such in conjunction with block 350 or 376 in accordance with instructions from the task requester. After block 379, the routine continues to block 390.

While the illustrated embodiment indicates a synchronous flow in which the routine waits for and obtains task performance results in block 373 after sending the task information in block 371, in other embodiments the routine may be structured in other manners, such as to continue with other processing while waiting for such task results (if any) to be received. In addition, in some situations, task performer users may not provide task results for a task after they have accepted an assignment to perform the task, which may be indicated to the routine in an explicit message from the task performer user that the task performer user is abandoning or withdrawing from task performance, or instead by not receiving task results within a specified period of time—if so, the routine may continue to handle other task-related requests and information. In addition, while not illustrated here, in other embodiments various types of notifications may be sent to task requesters related to their submitted tasks, such as when a task is assigned to a task performer user for performance and/or when an assigned task is withdrawn from a task performer user who has not completed the performance, and/or when task results are available to be obtained.

If it was instead determined in block 370 that the received indication was not to perform a task, the routine continues instead to block 380 to determine whether the received indication is to specify information related to user qualifications, and if so continues to block 382 to manage qualifications based on the specified information. Managing qualifications may include, for example, defining a new type of qualification for use with the system, specifying a particular qualification for a particular user, removing a particular qualification from a user, removing a particular qualification from the system, etc.

If it was instead determined in block 380 that the received indication was not to specify qualification-related information, then the routine continues instead to block 383 to determine whether the received indication is information specified by a task requester related to task performance results previously received from a task performer user in block 373. If so, the routine continues to block 385 to execute a Task Results Manager routine as described further with respect to FIG. 4. The information specified by the task requester may include, for example, an indication as to whether particular results are fully satisfactory, partially satisfactory, or not satisfactory, and optionally one or more actions to be performed (e.g., facilitating full or partial payment and/or one or more results improvement options to be offered to one or more task performer users to improve the task results).

If it was instead determined in block 383 that the received indication was not information from a task requester related to task performance results, then the routine continues instead to block 388 to perform another indicated operation as appropriate, such as to receive and store various types of user information (e.g., information related to a user's identity or attributes, information related to an account of a user with the system, information related to specifying access controls for information and/or functionality, administrative requests related to system operations, requests for information related to monitoring performance of tasks or other operations of the system, etc.), to handle an indication from a task performer user indicating a withdrawal from or abandonment of an assignment to perform a task, etc.

After blocks 340, 350, 366, 379, 382, 385, or 388, or if it was determined in block 330 not to perform automated matching, the routine continues to block 390 to optionally perform any additional housekeeping operations, such as to store information that is generated or received during execution of the routine, to generate summary aggregate information for the system related to tasks and users, to take appropriate actions when events do not occur within specified periods of time (e.g., to withdraw assigned tasks from task performer users who do not timely perform the tasks, or to provide rewards to task performer users for tasks that they have performed when task requesters do not timely reject the task results provided by the task performer users), etc. After block 390, the routine continues to block 395 to determine whether to continue. If so, or if it was determined in block 315 that the sender was not authorized, the routine returns to block 305, and if not continues to block 399 and ends. While the illustrated embodiment may include tasks being specified one at a time, in other embodiments tasks may instead be specified in other manners, such as to allow multiple tasks to be submitted together (e.g., to allow for batch processing), whether or not those tasks are related to each other.

Figure 4:
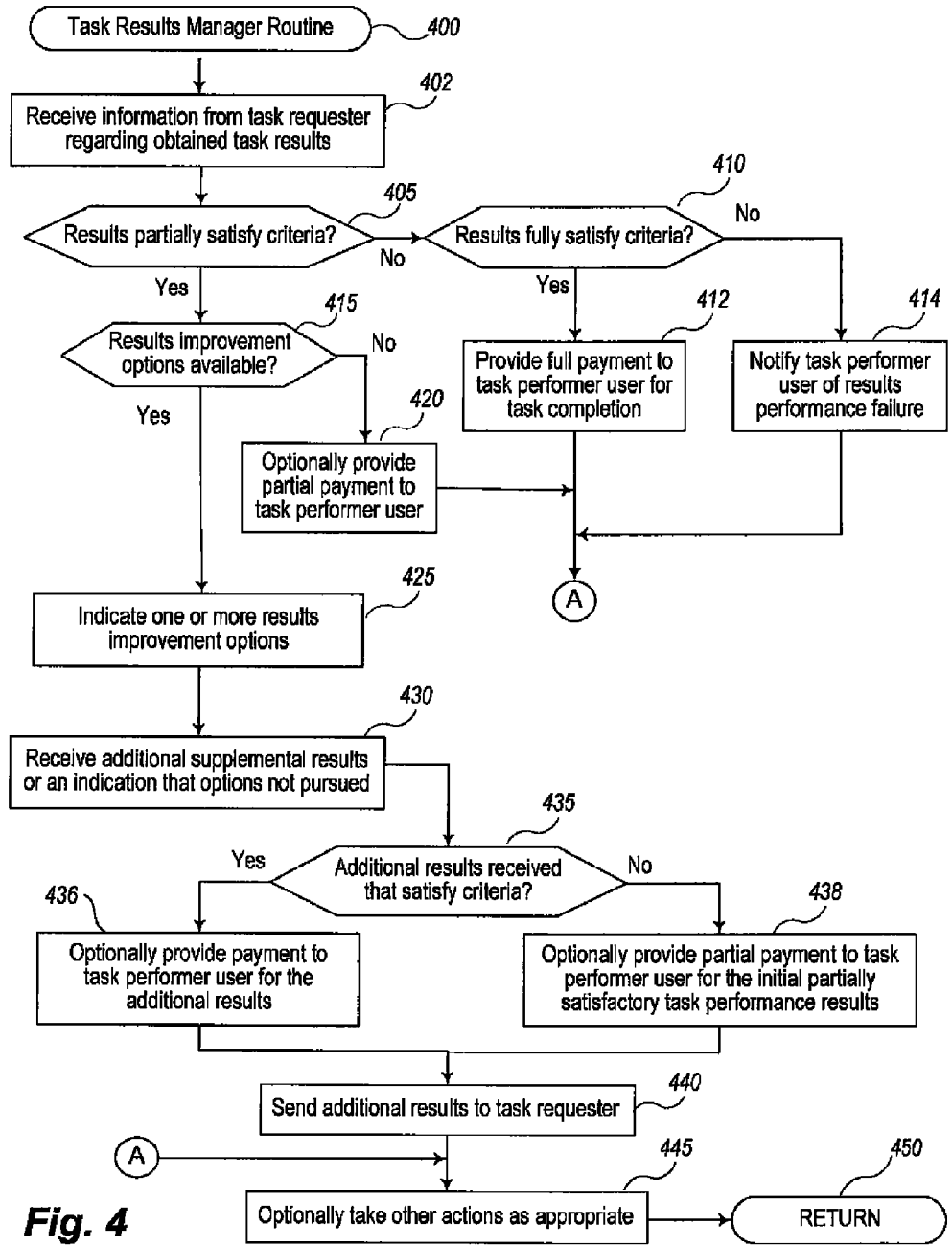
FIG. 4 is a flow diagram of an example embodiment of a Task Results Manager routine.

FIG. 4 is a flow diagram of an example embodiment of a Task Results Manager routine 400. The routine may be provided by, for example, execution of an embodiment of the task results manager component 242 of FIG. 2 and/or a portion of the task exchange server 100 of FIG. 1, such as to facilitate the improvement of results from the performance of tasks by task performer users. In overview, the routine obtains information from task requesters related to task performance results obtained from task performer users, and takes corresponding actions as appropriate.

The routine begins in block 402, where it receives information from a task requester regarding indicated task performance results generated by one or more task performer users.

The received information may include a variety of types of feedback from the task requester regarding the task performance results, such as to indicate a degree or level of satisfactoriness of the task performance results, one or more partial payment amounts for improving the task performance results in one or more indicated manners, other comments related to improving the task performance results (e.g., indications of one or more ways to improve the task performance results, such as for one or more results improvement options to be provided to one or more task performer users), etc. In the illustrated embodiment of the routine, the satisfactoriness of task performance results are evaluated with respect to one or more criteria (e.g., criteria previously specified by the task requester for the task; criteria currently specified by the task requester as part of the information provided in block 405; criteria used by the task requester to evaluate the results but not expressly indicated by the task requester; criteria specified other than by the task requester, such as default criteria for results; etc.), but in other embodiments may be evaluated or expressed in other manners. In block 405, the routine then determines whether the received information in block 402 specifies that the indicated task performance results are determined by the task requester to partially satisfy criteria for those results. If not, the routine continues in block 410 to determine whether instead the task results are indicated by the task requester to fully satisfy criteria for the results, and if so continues in block 412 to provide or otherwise indicate, designate, convey, or facilitate a full reward (e.g., full payment for the task) to the task performer user that generated those task performance results. The routine then continues to block 445. If it was instead determined in block 410 that the task results do not fully satisfy criteria for the results, then the routine continues in block 414 to notify the task performer user of that the task performance results are not satisfactory or are otherwise not accepted (e.g., to notify the task performer user that no reward will be provided). The routine then continues to block 445.

If it was instead determined in block 405 that the indicated task performance results partially satisfy criteria for the task, then the routine continues in block 415 to further determine whether the task performer user(s) who provided the indicated task results are to receive an opportunity to improve the indicated performance results. The determination of whether to provide the opportunity to the task performer user(s) may be made in various ways in various embodiments, such as based on information received from the task requester in block 402, or instead in some embodiments in other manners (e.g., based on predefined preferences or other related information, such as by the task requester for that task, for all tasks, for all tasks of that type, etc.; automatically by the task exchange server; etc.). In addition, in the illustrated embodiment, the opportunity to improve task performance results is provided only to some or all of the task performer users who generated the performance results, although in other embodiments other task performer users may be provided such an opportunity, whether instead of or in addition to the task performer users who generated the performance results. In addition, if the task requester indicates to provide an opportunity to improve the indicated performance results, the task requester may further specify additional information related to the opportunity, such as information related to one or more results improvement options (e.g., an indicated manner in which to improve the performance results for the option, one or more indicated criteria that the improved performance results are to satisfy for each option, a supplemental payment amount to be paid to a task performer user who generated supplemental performance results in accordance with the option, etc.). Furthermore, regardless of whether an opportunity to improve the indicated performance results is to be provided, the task requester may specify a partial payment to be paid to the task performer user(s) who generated the indicated performance results based on the partial satisfactoriness of those performance results.

If it is determined in block 415 that the task performer user(s) who provided the indicated task results are not to receive an opportunity to improve the indicated performance results, then the routine continues in block 420 to optionally provide or otherwise indicate, designate, convey, or facilitate a partial reward (e.g., a partial payment) to the task performer user(s) for the indicated performance results, such as a partial reward that is indicated by the task requester in the information received in block 402. Note that in some cases such a reward may be provided at other times and through other mechanisms, such as in accordance with blocks 350 and/or 379 in FIG. 3. The routine then continues to block 445.

Alternatively, if it is instead determined in block 415 that the task performer user(s) who provided the indicated task results are not to receive an opportunity to improve the indicated performance results, then the routine continues in block 425 to provide information to one or more of the task performer user(s) about one or more available results improvement options, such as to reflect results improvement options indicated by the task requester in the information received in block 402 and/or results improvement options automatically determined by the task exchange server (e.g., options to address one or more criteria for the task that the indicated performance results did not satisfy). If multiple task performer users contributed to the indicated performance results, a determination of which of the task performer users will receive the information about the results improvement options may be made in various ways in various embodiments, such so to select all of the multiple task performer users, to allow the task requester to select one or more of the multiple task performer users, to select one or more of the task performer users based on their contribution to the indicated performance results (e.g., to select those that contributed the most satisfactory results or that otherwise best satisfied one or more other performance measures), to select one or more of the task performer users based on characteristics of the task performer users (e.g., qualifications), etc. In at least some embodiments, each results improvement option may be associated with a supplemental reward amount (e.g., supplemental payment amount) if additional supplemental results are received in accordance with that results improvement option (e.g., supplemental results that satisfy criteria associated with that results improvement option, supplemental results that fully satisfy the criteria originally associated with the task, etc.). Furthermore, the task performer users may further in some embodiments and situations elect to not pursue any of the results improvement option, and to instead receive a partial payment amount for the already obtained performance results (e.g., a partial payment amount indicated by the task requester in the information received in block 402). Furthermore, as noted, in other embodiments one or more results improvement options may be made available to task performer users other than the task performer user(s) who generated the indicated performance results. This outcome may occur, for example, if the task requester believes that a more skilled task performer user may provide advantages to completing the task. In such a case, the routine may optionally provide a partial payment at this time to the task performer user who generated the indicated partially satisfactory results.

In block 430, the routine then waits until additional supplemental results are received in accordance with one or more of the indicated results improvement options, or an indication is received that the task performer user(s) are not pursuing any of the options (e.g., an explicit indication from one or more of the task performer user(s), the expiration of a deadline for the task performer user(s) to indicate that one or more of the options are being pursued, the expiration of a deadline for the task performer user(s) to provide the supplemental results, etc.). After block 430, the routine continues to block 435 where it determines whether additional supplemental task results were received in accordance with one or more of the indicated options that satisfy criteria for those options (or generally for the task). If so, the routine continues in block 436 to optionally provide or otherwise indicate, designate, convey, or facilitate payment to the task performer user for the initial and supplemental results (e.g., full payment if the initial and supplemental results are fully satisfactory). If it is instead determined in block 435 that no additional satisfactory task results were received (whether after receiving unsatisfactory supplemental results or receiving no additional supplemental task results), then the routine continues in block 438 to optionally provide or otherwise indicate, designate, convey, or facilitate a partial reward (e.g., partial payment) to the task performer user for the initial task results that were partially satisfactory. After blocks 436 or 438, the routine then continues in block 440 to send any received additional supplemental results to the task requester, although in other embodiments only received supplemental results that satisfy the criteria are provided to the task requester. In yet other embodiments, any received supplemental results are provided to the task requester as part of block 435, so that the determination of whether the supplemental results are satisfactory and/or of any corresponding supplemental payment amount to be paid may be made by the task requester and indicated as part of block 435. Furthermore, while not illustrated here, in some embodiments the process of improving task results may be repeated one or more additional times, such as if the task requester, after reviewing the additional supplemental results, again requests the task exchange server routine in block 383 to initiate task results improvement for the received additional supplemental results, causing the routine in FIG. 4 to execute again. Accordingly, although not shown, the routine may be invoked repeatedly (e.g., recursively or iteratively) to process each subsequent received additional supplemental results.

After blocks 412, 414, 420, or 440, the routine continues to block 445 to optionally take other actions as appropriate, such as to store information associated with actions taken. The routine then continues to block 450, and returns.

Figure 5:
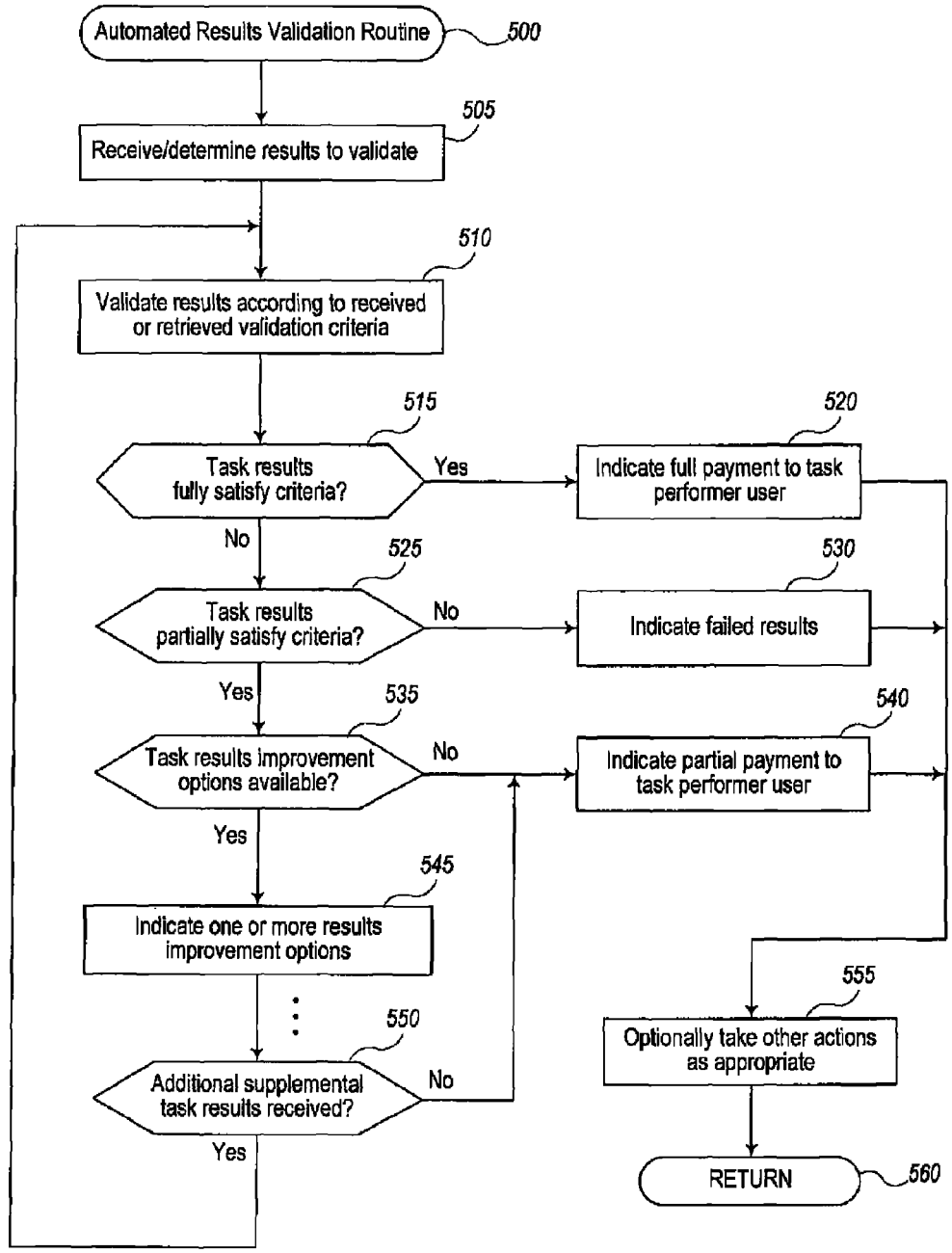
FIG. 5 is a flow diagram of an example embodiment of an Automated Results Validation routine.

FIG. 5 is a flow diagram of an example embodiment of an Automated Results Validation routine 500. The routine may be provided by, for example, execution of a component 244 of the task exchange server 240 of FIG. 2 and/or a portion of the task exchange server 100 of FIG. 1, such as to automatically validate task performance results from task performer users in accordance with validation criteria (e.g., as specified by a task requester for the task via a validation API or user interface). Furthermore, while not illustrated here, in at least some embodiments automated validation of task performance results may be combined with manual validation by a task requester of task performance results in at least some situations, such as to use automated validation of initial results and manual validation of additional supplemental results, or to combine automated and manual validation of a single group of results. Other combinations and logic also may be incorporated.

The illustrated embodiment of the routine begins in block 505, where it receives or otherwise determines performance results that are to be automatically validated. In block 510, the routine automatically validates the determined results according to received or retrieved validation criteria for the task. As described in greater detail elsewhere, such criteria may be provided by a task requester or otherwise determined. In block 515, the routine determines whether the task results fully satisfy the validation criteria, and if so continues in block 520 to provide or otherwise indicate, designate, convey, or facilitate a full reward for the determined performance results. The routine then continues to block 555. If it was instead determined in block 515 that the task results did not fully satisfy the validation criteria, then the routine continues instead to block 525 to determine whether the task results partially satisfy the validation criteria. If not, then the routine continues in block 530 to indicate, designate, or otherwise facilitate notification to a task performer user who generated the task results that the results fail to satisfy the validation criteria, such that reduced or no payment may be made. In other embodiments, failed results may instead be treated in a manner similar to those that are partially satisfactory, so as to provide task performer users with an opportunity to improve the results. After block 530, the routine continues to block 555.

If it was instead determined in block 525 that the task results do partially satisfy the validation criteria, then the routine instead continues to block 535 to determine whether any results improvement options are available for the determined task results. For example, the task requester may have previously indicated that an improvement opportunity is to be provided to a task performer user whose results partially satisfy the validation criteria. While not illustrated here, in other embodiments the validation criteria may assess multiple degrees or levels of partial satisfactoriness, such as with different results improvement options (or with results improvement options available only for some of the partial satisfactoriness levels or degrees). If no results improvement options are available, then the routine continues in block 540 to provide or otherwise indicate, designate, convey, or facilitate a partial reward for the determined performance results that are partially satisfactory, and the routine then continues to block 555.

If it was instead determined in block 535 that one or more results improvement options are available, then the routine instead continues in block 545 to provide information to one or more task performer users about the results improvement options, such as in a manner similar to that described with respect to block 425 of FIG. 4. In block 550, the routine determines whether any additional supplemental task results were received in accordance with the results improvement options, and if so returns to block 510 to automatically validate the additional supplemental results according to validation criteria in a similar manner to that previously described. If not, the routine continues to block 540.

After blocks 520, 530, or 540, the routine continues to block 555 to optionally take other actions as appropriate, such as to store information regarding the automated validation actions that were performed. The routine then continues to block 560, and returns.

Although the results validation routine is illustrated so as to automatically provide iterative opportunities for results improvement, such a routine could instead be implemented to automatically validate only the initial results that were fully satisfactory, such that a task requester would separately manually review any results that only partially satisfied the validation criteria. The automated validation routine could also be implemented to perform a specified number of iterations defined by the task requester, or according to other validation rules.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A computer-implemented method for automatically facilitating improvement of results of task performance, the method comprising:
   receiving, by a computer, a first of a plurality of tasks having an associated first payment amount for successful performance of the first task in accordance with one or more associated first criteria for results of the performance;
   receiving, by the computer, a second of the plurality of tasks that is distinct from the first task, the second task having an associated second payment amount for successful performance of the second task in accordance with one or more associated second criteria that include one or more validation tests for results of the performance of the second task;
   providing to a task requester, by the computer, first performance results for the first task that are generated by a task performer;
   receiving from the task requester, by the computer, information indicating:
      a partial payment amount for the first performance results based at least in part on the first performance results partially satisfying the first criteria associated with the first task, the partial payment amount being less than the first payment amount for the first task, and
      one or more results improvement options for improving the first performance results that each have an indicated supplemental payment amount for improving the first performance results in accordance with that option;
   providing, by the computer, the received information to the task performer;
   in response to receiving supplemental results for the first task that are generated by the task performer in accordance with one of the results improvement options, initiating, by the computer, supplying of the supplemental payment amount associated with the one results improvement option to the task performer; and
   in response to receiving, by the computer, second performance results for the second task that are generated by one or more task performers,
      determining that the second performance results satisfy the second criteria by applying at least one of the validation tests to the second performance results; and
      supplying the second payment amount to the one or more task performers.

2. The method of claim 1 wherein the initiating of the supplying of the supplemental payment amount is performed after receiving an indication that the supplemental results are approved by the task requester.

3. The method of claim 1 wherein the initiating of the supplying of the supplemental payment amount is performed after automated validation of the supplemental results.

4. The method of claim 1 wherein the received information from the task requester further indicates that the first performance results have been determined by the task requester to partially satisfy the first criteria associated with the first task.

5. The method of claim 1 further comprising validating, by the computer, the first performance results so as to determine that the first performance results partially satisfy the first criteria associated with the first task.

6. The method of claim 4 wherein the first criteria associated with the first task indicate one or more validation tests, and wherein the validating of the first performance results includes applying at least one of the indicated validation tests to the first performance results.

7. The method of claim 1 wherein the one or more results improvement options each include instructions from the task requester regarding a manner of improving the first performance results.

8. The method of claim 7 wherein the supplemental payment amounts for the results improvement options are indicated by the task requester in the received information from the task requester.

9. The method of claim 1 wherein the indicated results improvement options are each determined so as to address at least one of the first criteria associated with the first task that are not satisfied by the first performance results, and wherein the supplemental payment amount for each of the results improvement options is based at least in part on a relative portion of the first payment amount for the first task that corresponds to the at least one criteria addressed by the results improvement option.

10. The method of claim 1 wherein the first associated criteria for results of the performance of the first task and the first payment amount are specified by the task requester.

11. The method of claim 1 wherein at least one of the first associated criteria and of the first payment amount are determined by a task exchange server provided at least in part by the computer.

12. The method of claim 1 further comprising replacing at least a portion of the first performance results with the received supplemental results, and providing the received supplemental results to the task requester.

13. The method of claim 1 wherein the computer is part of a task exchange server that acts as an intermediary to facilitate performance by multiple human task performer users of tasks supplied by multiple unaffiliated task requesters.

14. A non-transitory computer-readable medium whose contents configure a computing system to facilitate improvement of results of task performance by task performers, by performing a method comprising:
receiving information from a task requester about a supplied task that is available for performance, the task having an indicated payment amount for results that satisfy one or more indicated criteria;
receiving results from performance of the task by a task performer, and providing the results to the task requester;
determining that the received results do not satisfy the one or more indicated criteria based on an indication from the task requester that the received results partially satisfy the one or more indicated criteria and an indication of a partial payment amount for the received results that is less than the indicated payment amount for the task;
providing information to the task performer that indicates the partial payment amount and one or more options for improving the received results to satisfy the one or more indicated criteria, each option having an associated supplemental payment amount;
receiving and providing to the task requester additional task performance results by the task performer that satisfy the one or more indicated criteria; and
facilitating supplying of the indicated payment amount to the task performer, and
wherein the configured computing system is part of a group of one or more computing systems that provide a task exchange server to facilitate performance by task performers of multiple tasks supplied by multiple task requesters.

15. The non-transitory computer-readable medium of claim 14 wherein the one or more criteria are validation criteria associated with the task, and wherein the determining that the received results do not satisfy the one or more indicated criteria is performed automatically by applying the validation criteria to the received results.

16. The non-transitory computer-readable medium of claim 14 wherein the computer-readable medium is a memory of the configured computing system, and wherein the contents are instructions that when executed cause the computing system to perform the method.

17. A computing system configured to automatically facilitate improvement of results of task performance by task performers, comprising:
a processor; and
one or more memories having instructions stored thereon that, when executed on the processor, cause the processor to:
in response to receiving initial results of performance of a task by a task performer, provide the received initial results to a task requester that supplied the task;
receive information from the task requester indicating that the received initial results partially satisfy one or more criteria associated with the task and indicating a first payment amount for the received initial results that is less than a full payment amount for successful performance of the task;
provide information to one or more task performers related to improving the received initial results including one or more results improvement options that each has an associated second payment amount for the task, wherein the provided information indicates the first payment amount for the received initial results; and
in response to receiving additional results of performance of the task by one of the task performers that are improved according to at least one of the results improvement options, facilitate supplying to the task performer the second payment amount associated with the at least one option.

18. The computing system of claim 17 wherein the one task performer user from whom the additional results of performance of the task are received is distinct from the task performer user from whom the initial results of performance are received.

* * * * *

UNITED STATES PATENT AND TRADEMARK OFFICE
CERTIFICATE OF CORRECTION

PATENT NO.       : 8,121,888 B1
APPLICATION NO.  : 11/957060
DATED            : February 21, 2012
INVENTOR(S)      : Peter D. Cohen et al.

It is certified that error appears in the above-identified patent and that said Letters Patent is hereby corrected as shown below:

In the Claims:

Column 22, Line 35, in Claim 6:
"6. The method of claim 4 wherein the first criteria" should read, --6. The method of claim 5 wherein the first criteria--.

Signed and Sealed this
Fourth Day of December, 2012

David J. Kappos
*Director of the United States Patent and Trademark Office*